United States Patent [19]
Sun et al.

[11] 4,106,071
[45] Aug. 8, 1978

[54] APPARATUS FOR PROTECTION AGAINST SUBSYNCHRONOUS CURRENTS IN A POWER SYSTEM

[75] Inventors: Shan C. Sun, Bell Township, Alleghany County; Larry L. Church, Washington Township, Washington County, both of Pa.

[73] Assignee: Westinghouse Electric Corp., Pittsburgh, Pa.

[21] Appl. No.: 757,178

[22] Filed: Jan. 6, 1977

[51] Int. Cl.² .............................................. H02H 3/38
[52] U.S. Cl. ........................................ 361/79; 361/83
[58] Field of Search ................... 361/79, 82, 110, 111; 307/352, 353, 360, 361

[56] References Cited
U.S. PATENT DOCUMENTS 3,558,986  1/1971  Schleif et al. ......................... 361/79

*Primary Examiner*—Harry E. Moose, Jr.
*Attorney, Agent, or Firm*—D. R. Lackey

[57] ABSTRACT

Apparatus for protecting a power system or a portion thereof against the effects of subsynchronous current oscillations is disclosed. A signal representative of or proportional to the subsynchronous current is developed via synchronous modulation and bandpass filter techniques. This signal is fully rectified to produce a waveform from which information can be garnered from both the positive and negative half-cycles.

A peak holding and peak status circuit then compares successive peaks of the rectified signal, which circuit is adapted to recognize only those peaks having increasing amplitude. The output of the peak holding and peak status circuit is utilized by three comparator circuits which individually employ differing reference voltage levels for overall evaluation purposes.

Given a predetermined frequency range of interest for the subsynchronous current, three timing circuits are used to insure that recognizable peaks of the rectified signal fall into the range of interest and exist for a predetermined evaluation time period. The evaluation time period is automatically changed by one of the comparator circuits if the instantaneous subsynchronous current exceeds its predetermined threshold level. A trip and count signal is then generated by the detection apparatus, regardless of the time period used for evaluation.

12 Claims, 5 Drawing Figures

APPARATUS FOR PROTECTION AGAINST SUBSYNCHRONOUS CURRENTS IN A POWER SYSTEM

CROSS-REFERENCE TO RELATED APPLICATIONS

Reference is hereby made to copending and related U.S. Pat. Application No. 757,177 filed on Jan. 6, 1977 in the name of S. C. Sun entitled "Apparatus For Detecting Subsynchronous Current In Power Systems", which application is commonly assigned. The disclosure therein is hereby incorporated by reference.

BACKGROUND OF THE INVENTION

The present invention relates to power transmission systems and, more particularly, to apparatus for detecting and monitoring subsynchronous current in such power transmission systems.

The existence of asynchronous oscillations, i.e., oscillations at frequencies other than the generator's normal frequency, in power systems and series-compensated transmission lines has been known for years. Asynchronous oscillations occur as a result of the interaction or resonance of the system's capacitive and inductive components in response to transient conditions such as switching surges, fault initiation, and clearing. Usually, the oscillations are quickly damped by the resistive losses of the system and the natural or resonant frequencies do not precipitate other resonance reaction elsewhere in the system.

However, as the series capacitor compensation technique is increasingly employed for optimizing transmission capability of long high-voltage and extra-high-voltage lines, the expectancy that the natural frequencies of the asynchronous oscillations could and would fall below the 60 hertz (Hz.) synchronous frequency of the system becomes greatly increased. When this happens, mechanical resonance response in the generating equipment, via the stator windings, might be triggered.

Once an electrically initiated mechanical oscillation takes place, sustained or growing subsynchronous oscillations can be expected in a fashion similar to that of a positive feedback system. This effect could lead to eventual malfunction or even destruction of the generating equipment. Recently, there have been reported existences of generator damage and failure caused by subsynchronous oscillations. Thus, detection, monitoring and control of subsynchronous oscillations have become critical problems in the utility industry.

It should be noted that any apparatus designed to accommodate the problems associated with subsynchronous currents must exhibit rapid detection capability and response selectively so that false alarms due to short-lived transients are not tripped. Furthermore, such apparatus must be possessed of a wide operating range, able to detect 0.01 per unit (p.u.) or less subsynchronous current (SSC) in the presence of a 60 hertz current of many p.u. or a subsynchronous current component of many p.u.

SUMMARY OF THE INVENTION

Accordingly, there is provided apparatus for protecting a power system or a portion thereof against the effects of subsynchronous current (SSC) oscillations. A signal representative of or proportional to the SSC is developed by synchronous modulation and bandpass filtering techniques. Development of this signal forms no part of this invention, the details of which are set forth in the above cross-referenced U.S. Pat. Application No. 757,177.

The SSC signal is fully rectified by circuit means provided for this purpose whereby evaluation of the SSC signal proceeds using information acquired from both positive and negative half cycles of the SSC signal. This arragement permits a continuous, dynamic evaluation as opposed to a half-wave rectification process. The rectified SSC signal is forwarded to a peak holding and peak status detection circuit which compares successive peaks therein. However, only those peaks having increasing amplitude are recognized and the peak voltage value held by the peak holding and peak status circuit. A fixed percentage voltage hysteresis circuit is included to insure that a half-cycle peak must be, at least, greater by the fixed percentage than the previous peak in order to be recognized. This arrangement permits the rejection of steady state and convergent SSC oscillations which are considered to be of non-critical interest. Thus, the disclosed apparatus is adapted to recognize and evaluate only growing or divergent SSC oscillations. A peak status pulse signal is produced in response to the presence of each recognizable SSC peak.

The peak holding and peak status circuit's output voltage, the amplitude of a recognized peak, is used by three comparator circuits wherein it is compared to voltage reference or threshold values set to insure that the SSC exceeds start, finish and instantaneous value criteria. Thus, evaluation of the SSC signal is predicated on the rate of rise and instantaneous value of the SSC signal at the start, during and at the finish of a predetermined evaluation period.

Three timing circuits are employed to insure that evaluation is limited to the frequency range of interest for the predetermined evaluation period. The timing circuit responsible for the evaluation period is further adapted so that its timing period can be changed if the instantaneous level of the SSC exceeds its threshold value.

The timing circuits are coupled to logic circuits which insure that an SSC signal having rising peaks, occurring successively within the frequency and amplitude range of interest over the evaluation period, will cause a trip signal to be issued and a count made of each such event. The timing and logic circuitry is arranged so that a trip caused by an excessive rate of rise of the SSC signal or by a violation of the instantaneous threshold level can be distinguished and counted. In addition, indicators for each such event are used should visual verification for an operator of the trip responsibility be deemed appropriate.

DESCRIPTION OF THE PREFERRED EMBODIMENT

In the preferred or in any other alternative embodiment of this invention, a signal proportional to or representative of subsynchronous current in a power system to be protected thereagainst is necessary. This signal, in this embodiment of the invention, is developed in accordance with the teachings set forth in copending U.S. Pat. Application Ser. No. 757,177, filed in the name of S. C. Sun and is cross-referenced hereinabove. For details in excess of those included in the following description, reference should be had to this application.

Figure 1A:
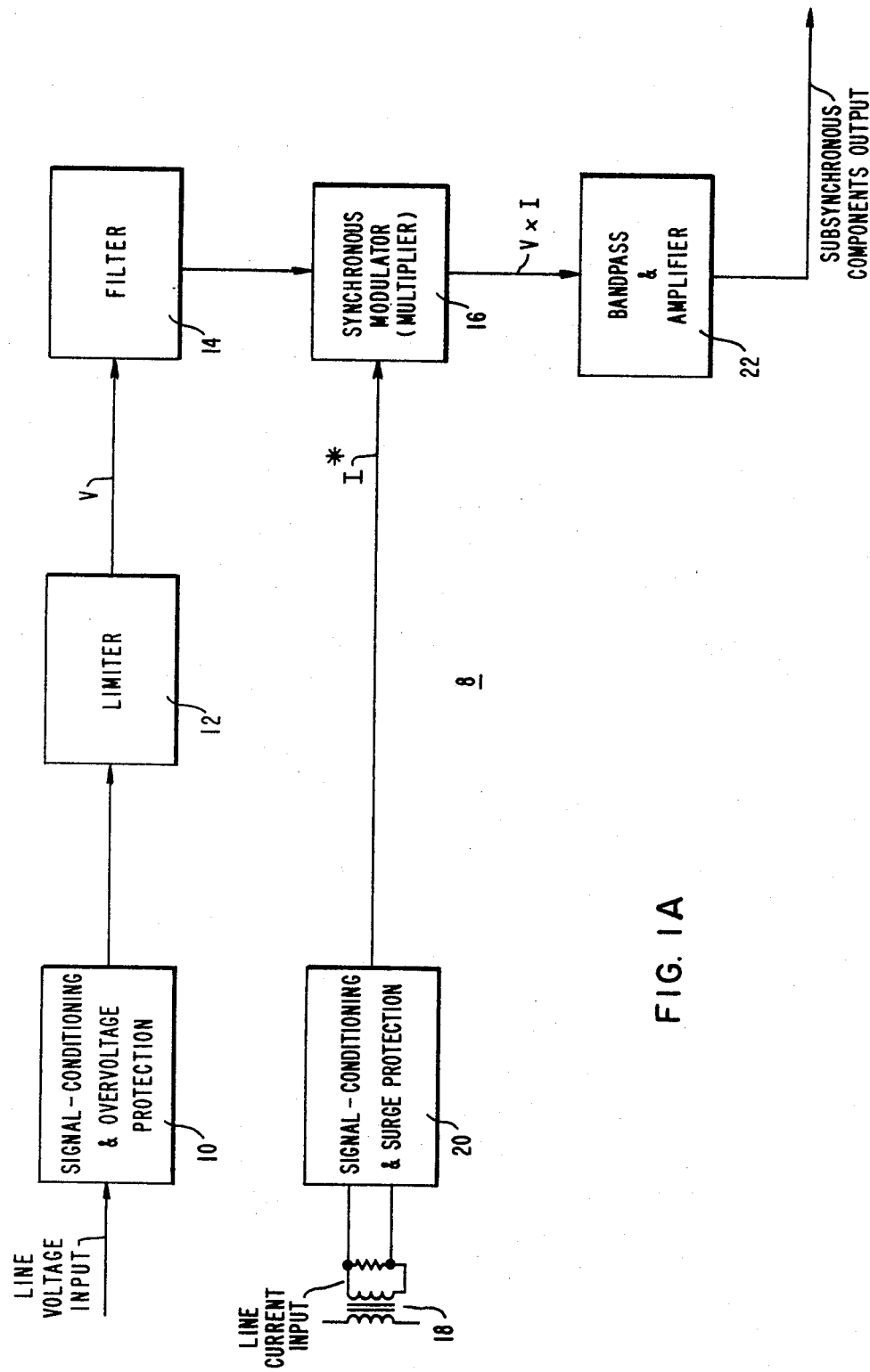
FIGS. 1A and 1B illustrate a block diagram of the invention wherein subsynchronous components are identified and isolated.

A functional block diagram of the apparatus employed to achieve single phase subsynchronous current monitoring is shown in FIG. 1A. It will be understood and appreciated by those skilled in the art, that the apparatus shown and the method implicit therein for monitoring subsynchronous current are applicable to three-phase systems also.

The line voltage, which usually carries very little asynchronous components, is used as a reference input to the synchronous monitoring circuit 8. The line voltage is brought down to a workable level, compatible with the components used to implement the functions of the synchronous monitoring circuit 8, by either a step-down transformer or a suitable voltage divider (not shown). The signal conditioning and protection circuit 10 removes high frequency noise and provides proper overvoltage protection for the synchronous monitoring circuit 8.

The limiter circuit 12 transforms the sinusoidal line voltage into a square-wave voltage of the same frequency, but having a well defined amplitude. This is achieved by high gain amplification and precision amplitude limiting means. The filter circuit 14 which follows the limiter circuit 12 receives its input V therefrom and removes the harmonic contents of the square wave to produce a constant amplitude, 60 hertz, sinusoidal voltage which is insensitive to line voltage fluctuations.

The line current signal, in which the subsynchronous components are contained, is acquired via a current transformer shunt circuit 18 or by other equivalent means. Once acquired, the line current signal is fed to the signal conditioning and surge protection circuit 20. The signal conditioning and surge protection circuit 20 is similar to the signal conditioning and overvoltage protection circuit 10 in that it also suppresses high frequency noise. It also provides current surge protection for the synchronous monitoring circuit 8.

The conditioned, filtered output voltage V of the filter circuit 14 and the conditioned, current signal I* (expressed in voltage form) of the signal conditioning and surge protection circuit 20 are fed to the synchronous modulator circuit 16. This circuit accepts the conditioned voltage and current signals and performs a multiplication function therewith, the results of which are best explained mathematically below. Assume that the line voltage and current after conditioning are mathematically represented as follows:

$$V = V_p \sin \omega_o t, \text{ and} \quad (1)$$

$$I = I_p \sin(\omega_o t + \theta) + I_s \sin \omega_s t; \quad (2)$$

where $V_p$ and $I_p$ are the peak values of the line voltage and current at normal line frequency ($\omega_o$), and $\omega_o$ = normal 60 hertz line frequency expressed in rad./sec., $\omega_s$ = subsynchronous frequency expressed in rad./sec., $I_s$ = peak value of subsynchronous current, and $\theta$ = phase angle between line voltage and current at normal line frequency.

Thus, the signal obtained at the output of the synchronous modulator circuit 16 is:

$$V \times I = (V_p I_p/2)[\cos \theta - \cos(2\omega_o t + \theta)] + (V_p I_s/2)[\cos(\omega_o - \omega_s) - \cos(\omega_o + \omega_s)t]. \quad (3)$$

It will be evident from inspection of equation (3) that the function of the synchronous modulator circuit 16, in performing its multiplication, is to eliminate the $\omega_o$ frequency. Thus, in performing a multiplication of the conditioned line voltage and current signals, it produces the doubled frequency term $2\omega_o$ and the two beat frequency terms $(\omega_o - \omega_s)$ and $(\omega_o + \omega_s)$. As a result, the frequency separation between the doubled frequency term $2\omega_o$ and the beat frequency term $(\omega_o - \omega_s)$ is much greater than the frequency difference between $\omega_o$ and $\omega_s$. Consequently, the filter design for separating $(\omega_o - \omega_s)$ from $2\omega_o$ is less difficult to implement than the design needed for separating $\omega_s$ from $\omega_o$.

Attenuation for the beat frequency term $(\omega_o + \omega_s)$ is carried out automatically by the bandpass filter circuit 22 which also serves to attenuate the $2\omega_o$ term since the $(\omega_o + \omega_s)$ frequency is in between $2\omega_o$ and $(\omega_o \omega_s)$ and the amplitude of the $(\omega_o + \omega_s)$ term is exactly the same as that of the $(\omega_o - \omega_s)$ term. In practice, the phase angle $\theta$ is either a fixed term or a term which varies very slowly.

Although the beat frequency term $(\omega_o - \omega_s)$ does not suggest the value of the $\omega_s$ frequency directly, a little interpretation will identify the exact $\omega_s$, since $\omega_o$ is clearly defined. Furthermore, since the term $V_p$ is a constant, the term $(V_p I_s)$ follows the amplitude behavior of the subsynchronous component precisely. Thus, a bandpass filter circuit 22 of readily implementable design will yield or provide at its output, the detected subsynchronous components.

It will be appreciated that, as an alternative approach, the $I_p \sin(\omega_o t + \theta)$ term in equation (2) can be removed from consideration by subsynchronous detection apparatus through the simple expedient of an appropriately designed filter. However, such an approach has serious drawbacks. Most important of these is the delay inherent in the use of such a filter, which delay might prevent responsive corrective action to the extracted subsynchronous current signal. In addition, the use of such a filter would add unnecessarily to the cost and complexity of the final design.

Figure 2A:
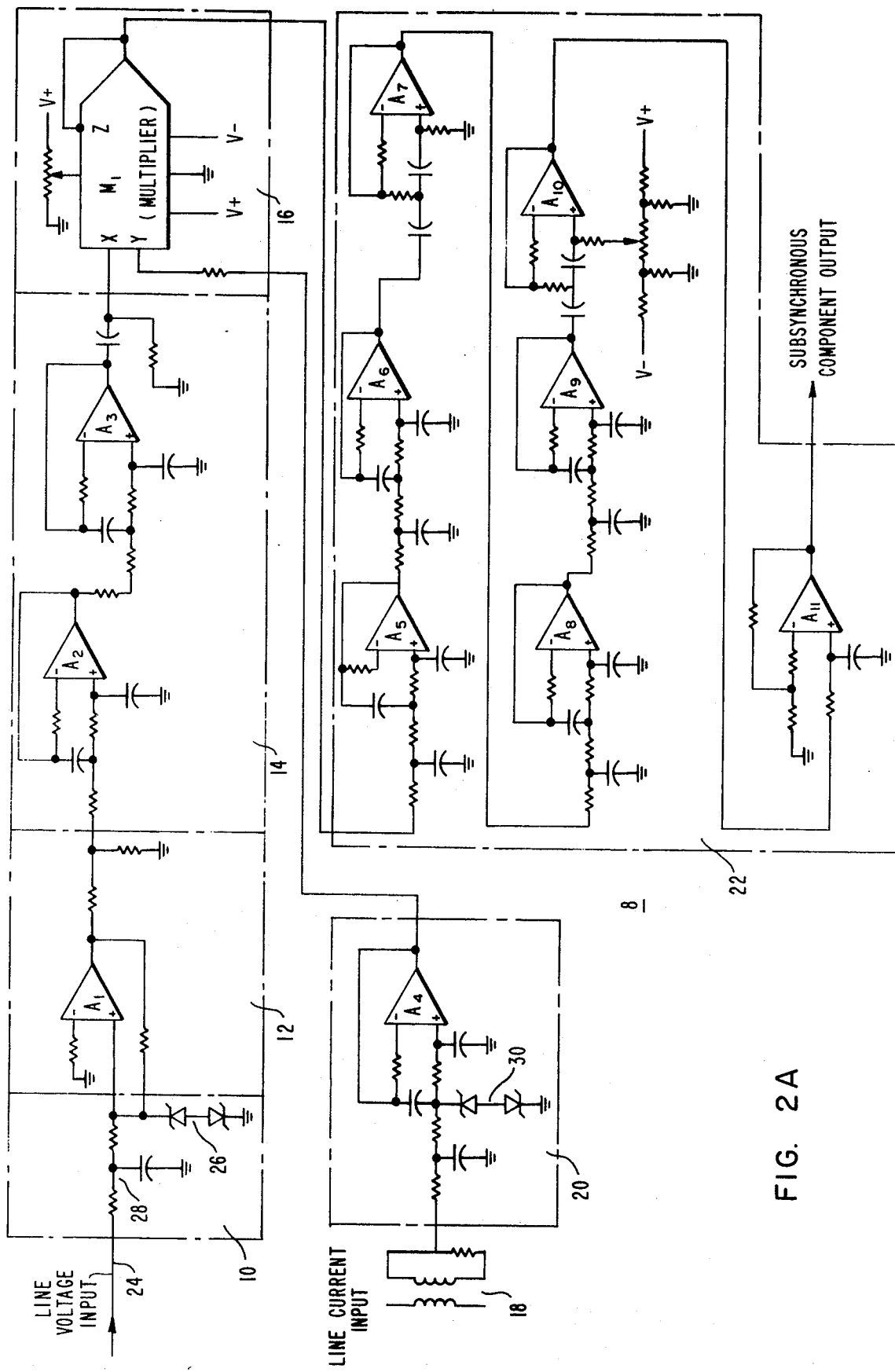
FIGS. 2A, 2B and 2C depict a circuit diagram wherein the block diagram of FIGS. 1A and 1B is practically implemented.

A practical design embodying the functional block diagram of FIG. 1A is illustrated in FIG. 2A. The 60 hertz line voltage signal is brought into the limiter circuit 12 wherein operational amplifier $A_1$ is suitably connected to yield a square-wave voltage having a 60 hertz fundamental frequency. The signal conditioning and overvoltage protection circuit 10 is interposed between the voltage input connection 24 and the limiting circuit 12. It contains a Zener diode overvoltage circuit 26 and a filter network 28 for protection against line overvoltages and for removing high frequency noise.

The square-wave output of the limiter circuit 12 is then lowpass filtered by a fifth order lowpass filter circuit 14 of active design, which includes the amplifiers $A_2$ and $A_3$, to yield a constant amplitude 60 hertz reference sinusoid for synchronous modulation use. The −3db frequency of the lowpass filter circuit 14 is about 60 hertz. The reference sinusoid is properly scaled and a.c. coupled to the synchronous modulator circuit 16. The a.c. coupling eliminates the need for offset voltage trimming in the limiter and filter circuits 12 and 14.

The current input signal is acquired via the current transformer shunt circuit 18 and fed therefrom to the signal conditioning and surge protection circuit 20. Circuit 20 includes a Zener diode circuit 30 for current surge protection and a third order lowpass filter, including amplifier $A_4$, for suppressing high frequency noise and unwanted current components. The current signal is derived from the current transformer shunt circuit 18 which has been adapted to provide 1.5 volts peak voltage, typically in the preferred embodiment, for each per unit (p.u.) of line current.

The conditioned input signals, V and I*, are then fed to the synchronous modulator circuit 16 where they are multiplied as described above. The multiplication function is performed by a precision analog multiplier $M_1$, which may be one of the M310 series manufactured by Intronix Corporation. The multiplier $M_1$ uses the pulse width/pulse height modulation principle which offers good accuracy and low drift. Since the multiplier $M_1$ has an internal 10 to 1 scaling factor, with a 10 volt peak reference sinusoid, the processed subsynchronous current or SSC is in a form of $[(VI_s/2) \cos (\omega_o - \omega_s)t]$, where $VI_s$ is the peak value of the SSC in voltage form as seen at the input of multiplier $M_1$.

The bandpass filter circuit 22 is of a modified Butterworth type having a thirteenth order lowpass section and a fourth order highpass section. It includes amplifiers $A_5$, $A_6$, $A_7$, $A_8$, $A_9$, $A_{10}$ and $A_{11}$ apropriately connected to yield the subsynchronous components. Filter circuit 22 is characterized by a flat passband response from 15 to 45 hertz with 80db attenuation at 1 hertz and 78db attenuation at 120 hertz. The response time for a step input is about 26 m.s. The output stage of filter circuit 22, amplifier $A_{11}$ and its supporting elements, has a built-in voltage gain of four which brings up the detected subsynchronous current signal $(\omega_o - \omega_s)$ level to 3 volts peak. This corresponds to 1 p.u. of line current. The lowpass section of filter circuit 22 serves to remove the $2\omega_o$ and $(\omega_o + \omega_s)$ terms from the output resultant of the synchronous modulator circuit 16 and the highpass section serves to remove the term $\theta$. Thus, only the $(\omega_o - \omega_s)$, properly scaled is outputted by filter circuit 22. It should be noted that amplifiers $A_1$ through $A_{11}$ each respectively comprise one-half of an $\mu$A747 dual operational amplifier, or an equivalent, which can be purchased under that designation from any one of a number of manufacturers.

Figure 1B:
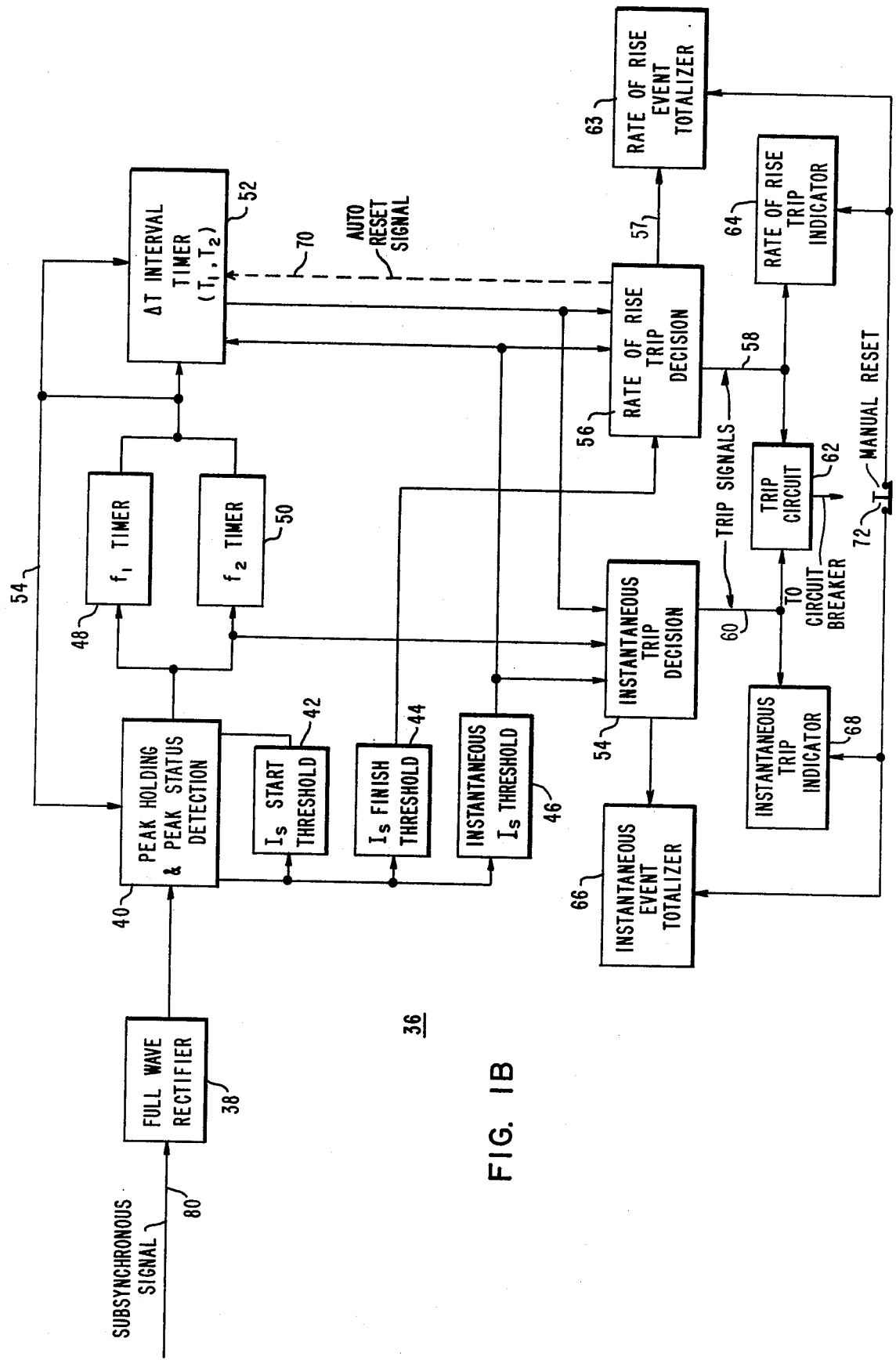

Referring now to FIG. 1B, there is shown the remainder of the functional block diagram of the invention. The basic concept of the detection apparatus 36 is to monitor and evaluate both the magnitude and rate of change of the SSC occurrence, i.e., $\Delta I/\Delta T$.

The SSC signal, which is developed as set forth above, is fed to a full wave rectifier 38 to obtain a unidirectional signal which will yield information from both halves of the sinusoidal subsynchronous current signal waveform. The rectified signal is then fed to the peak holding and peak status circuit 40. The value of the peak held voltage is then utilized by three SSC comparators; the $I_s$ start threshold comparator 42, the $I_s$ finish threshold comparator 44 and the instantaneous $I_s$ comparator 46, wherein these values of $I_s$ are compared with predetermined reference voltages. The $I_s$ start threshold determines whether the minimum level of SSC is worth evaluating, the $I_s$ finish threshold similarly determines whether the level that must be obtained at the end of the evaluation period ($\Delta T$) warrants corrective action, and the instantaneous $I_s$ threshold is employed to determine whether the SSC level reaches a magnitude which calls for shortening the evaluation period from a time of $T_1$ to a time of $T_2$. In the preferred embodiment $T_1$ has been selected to be 150 m.s. and $T_2$ is set to be 50 m.s., however these intervals are changeable to suit the equipment and system being monitored.

The peak status portion of circuit 40 issues a pulse of defined width, about 0.5 m.s., whenever an SSC peak amplitude greater than a previous peak is detected. A small, fixed percentage voltage hysteresis is built into circuit 40 and causes this circuit to recognize only those following peaks having a rising slope. Thus, the peak voltage of the next half-cycle of the SSC signal must be higher by at least the fixed percentage in order to be recognized and in order to continue the evaluation process. In this manner, the peak holding and peak status circuit 40 is adapted to reject or ignore steady amplitude or decreasing SSC signals which correspond to the design criteria that only growing oscillations are dangerous and warrant tripping or corrective action.

The timing span of the $f_1$ and $f_2$ timers 48 and 50 is based on the frequency range of interest. For example, if the frequency range of interest is from 15 hertz ($f_1$) to 45 hertz ($f_2$), then the $f_1$ timer 48 will be set to a timing span of 33 m.s., the half-cycle time corresponding to 15 hertz, and the $f_2$ timer 50 will be set to a timing span of 11 m.s., the half-cycle time corresponding to 45 hertz. It should be remembered that the SSC signal is a measure of the $(\omega_o - \omega_s)$ term so that $f_1$ and $f_2$ correspond to the possible difference or result of that term. If incoming peaks are of such a frequency to be within the band of interest, then the $\Delta T$ interval timer 52 is rendered active. If two peaks are separated by a time interval longer than that of the $f_1$ timer 48 or shorter than that of the $f_2$ timer 50, then the $\Delta T$ interval timer 52 and the peak holding and peak status circuit 40 are reset.

With an increasing SSC signal in the frequency range of interest, the $\Delta T$ interval timer 52 will run. If the $\Delta T$ interval timer times out, that is it runs for either period $T_1$ or $T_2$, it will issue a signal indicative of this. The time intervals $T_1$ and $T_2$ are predetermined and are based on the need of the system being protected by the detection apparatus 36. Thus, $T_1$ will be selected to correspond to whatever time interval is appropriate, in waiting to take corrective action, so that it is long enough to avoid trips in response to short lived transients or oscillations, yet short enough to respond to harmful SSC's which would damage the system or a portion thereof. In the preferred embodiment which embraces this design criteria, the time interval $T_1$ is in effect and governs overall response for any signal which does not reach the instantaneous $I_s$ threshold level. However, when an SSC signal does reach the instantaneous $I_s$ threshold level, then the time interval of the timer 52 is shortened by a signal from the instantaneous $I_s$ threshold circuit 46 from $T_1$ to $T_2$. As will be appreciated, a rising signal that reaches the instantaneous $I_s$ level at any time less than $T_1$ could effect a total trip determining time of anywhere between the times $T_1$ and $T_2$.

As stated, timer 52 issues a completion signal at the end of its timing period. This signal goes to two trip decision circuits; the instantaneous trip decision circuit 54 and the rate of rise trip decision circuit 56. For a rate of rise trip signal to be issued on line 58 to the trip circuit 62, the time, $T_1$, of rise must be completed, the $I_s$ finish threshold level must be exceeded, and the instantaneous $I_s$ level not reached. A rate of rise ready trip signal is issued on line 57 if the time of rise is completed and the instantaneous $I_s$ threshold level has not been reached. It is not necessary for the $I_s$ finish level to be reached in order to obtain a rate of rise count by totalizer 63. As will be explained hereinafter, the auto reset signal on line 70 is also issued under these conditions. The rate of rise totalizer 63 will not, however, register succeeding counts due to the resetting of the $\Delta T$ interval timer 52 through the issuance of the auto reset signal if the same increasing subsynchronous condition is present. A succeeding count will therefore only be registered if timer 52 has been reset by the $f_1$ or $f_2$ timers 48 and 50.

The instantaneous trip decision circuit 54 issues a trip signal on line 60 when the time of rise is completed, the instantaneous $I_s$ threshold has been exceeded and one more recognizable peak has occurred. The last requirement of an additional recognizable peak occurring is used because the $T_2$ time is relatively short for the high instantaneous level and a continually increasing SSC situation needs to be assured in order to avoid unnecessary tripping. With the $T_2$ time plus an additional recognizable peak, a full cycle will be examined. A count, however, will be registered by the instantaneous event totalizer 66 on the completion of the time of rise and with the instantaneous $I_s$ threshold exceeded.

The generation of a trip signal by either the instantaneous trip decision circuit 54 or the rate of rise decision circuit 56 will cause actuation of the trip circuit 62. This, in turn, will open any coupled circuit breaker (not shown) as may be deemed necessary. The instantaneous trip indicator 68 and the rate of rise indicator 64 are lights or any other equivalent indicating device which are employed to show which condition initiated tripping action. The manual reset 72 is employed to reset the totalizers 63 and 66 and the indicators 64 and 68 when desirable.

Figure 2B:
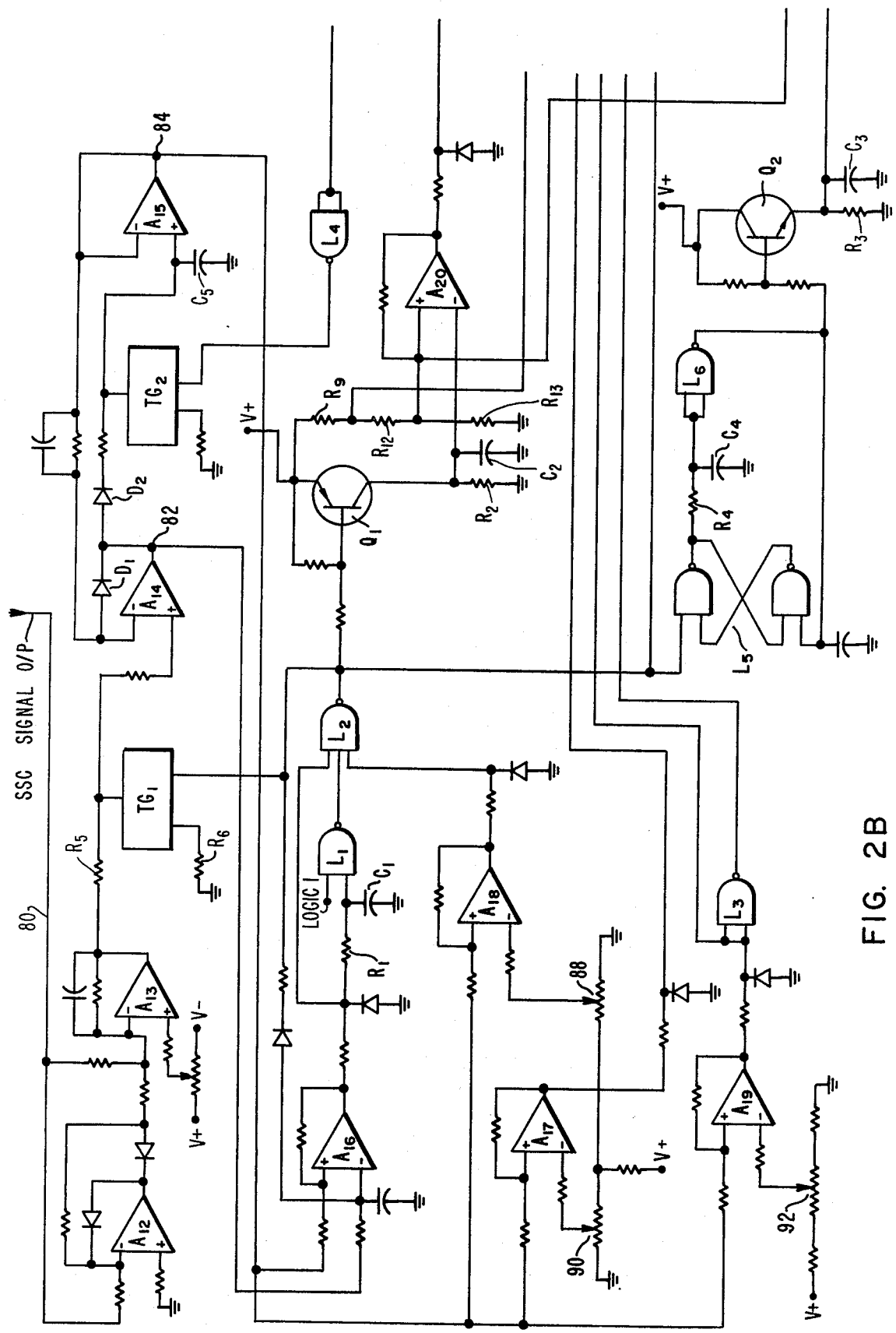
Figure 2C:
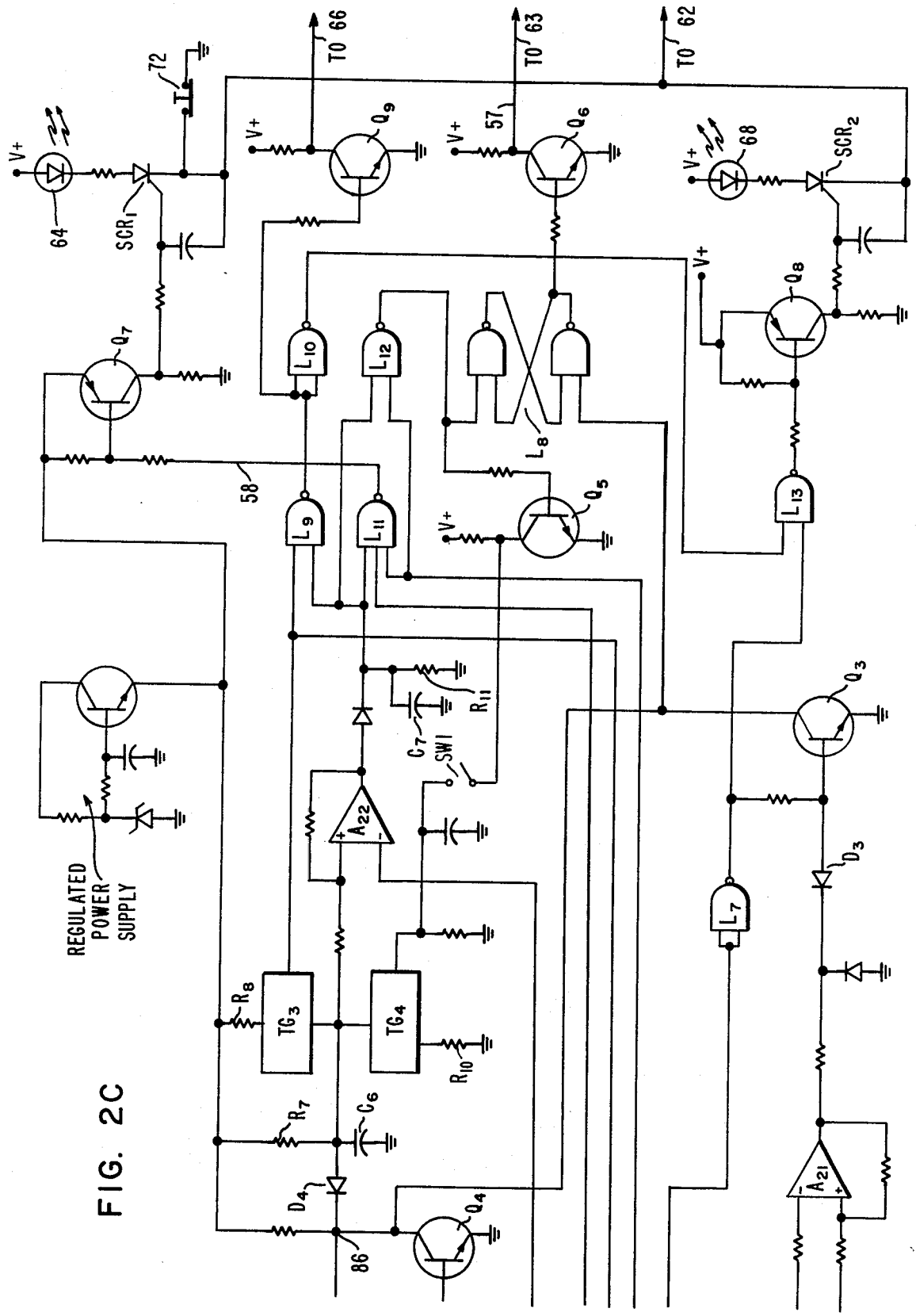

A design embodying the functional block diagram of FIG. 1B is illustrated in FIGS. 2B and 2C. The subsynchronous current signal $I_s$ is introduced into the detection apparatus 36 via line 80. It is fed to the full wave rectifier circuit 38. Operational amplifier $A_{12}$ and its associated circuitry is adapted to perform a half-wave rectification on the $I_s$ signal. Operational amplifier $A_{13}$ and its associated circuitry, used as a summing circuit, completes the full wave rectification.

$TG_1$ is a bilateral solid state switch, which can be one of the RCA CD4066 series or an equivalent, which is normally closed or on. Once a peak is detected, as shall be hereinafter explained, $TG_1$ is shut off or opened, thereby opening the path to ground through resistors $R_5$ and $R_6$. The value of the resistors $R_5$ and $R_6$ is preselected to reduce the peak voltage entering amplifier $A_{14}$ by a small, fixed percentage. Thus, the voltage divider action of $R_5$ and $R_6$ insures that each succeeding peak must be increased in magnitude by at least the fixed percentage in order for it to be recognized.

The input to the peak holding and peak status circuit 40, after being reduced by the action of switch $TG_1$, is fed to amplifier $A_{14}$ which serves as a peak holding driver. Its output, point 82, is arranged to be at a voltage potential about one forward biased diode voltage drop higher than the output of amplifier $A_{15}$, at point 84. Thus, the output of amplifier $A_{15}$ will be equal to the input to amplifier $A_{14}$. The peak voltage holding capacitor $C_5$ is fed and thereby charged only when the incoming voltage is greater than the voltage being held. Under this condition, diode $D_1$ is backbiased or non-conducting and the feedback to amplifier $A_{14}$ is achieved through the output of amplifier $A_{15}$. When the incoming voltage is less than the held voltage, diode $D_2$ becomes back biased and the feedback is around amplifier $A_{14}$ and through diode $D_1$. At point 82, a change of two diode forward voltage drops is therefore observed whenever a change in the feedback path takes place. As a result of this arrangement, the voltage level at point 84 will be one diode forward voltage drop below that at point 82 whenever the incoming or fully rectified $I_s$ signal is greater than the voltage being held. Alternatively, the voltage level at point 84 will be one diode forward voltage drop above that at point 82 whenever the incoming voltage is less than the voltage being held.

The voltages at points 82 and 84 are applied to the inputs of comparator amplifier $A_{16}$. Whenever the held voltage at point 84 is greater than the incoming voltage seen at point 82, the output of amplifier $A_{16}$ is set to a logical HI. Conversely, whenever the held voltage is less than the incoming voltage, the output of amplifier $A_{16}$ is set to a logical LO. After a time delay introduced by the RC time constant of resistor $R_1$ and capacitor $C_1$, the logical HI signal is fed to and triggers a monostable circuit comprised of NAND gates $L_1$ and $L_2$. If the voltage level of $I_s$ start is above its predetermined threshold value, the positive going transition at the output of amplifier $A_{16}$ causes a short pulse, the peak status signal, of about 0.5 m.s. duration at the output of NAND gate $L_2$. This pulse is used to toggle the bistable switch $TG_1$. This pulse is also utilized to initiate the $f_1$ and $f_2$ timing circuits 48 and 50.

The peak status signal enters the $f_1$ timing circuit 48 and sets flip-flop $L_5$. This action, in turn, sets the inverter $L_6$ after a small time delay of 1 m.s. caused by the RC time constant introduced by resistor $R_4$ and capacitor $C_4$. This produces a logical LO signal at the output of inverter $L_6$ which turns on transistor $Q_2$, which is normally off or non-conducting. When transistor $Q_2$ turns on, capacitor $C_3$ is charged to the voltage level of the plus bus and remains charged for 10 m.s., the RC time constant of resistor $R_3$ and capacitor $C_3$. Thus, the time delay of the $f_1$ timing circuit is a total of 11 m.s., or a half cycle of 45 hertz which corresponds to the low end of the SSC frequency range of interest.

The output of operational amplifier $A_{21}$ is set high when transistor $Q_2$ is turned on and it will remain high for entire timing period of the $f_1$ timing circuit 48. Transistor $Q_3$ is normally off or non-conducting. When the output of operational amplifier $A_{21}$ is set high, it reverse biases diode $D_3$ thereby arming transistor $Q_3$ and the input to inverter $L_4$. When inverter $L_4$ resets the bilateral switch $TG_2$, this allows capacitor $C_5$ to discharge. Thus, the peak holding and peak status detection circuit will ignore any otherwise recognizable $I_s$ peak pulse if it occurs within 11 m.s. of the preceding recognized peak pulse. Inverter $L_7$ inverts the peaks status signal and applies this inverted signal across the base-emitter junction of transistor $Q_3$. This insures that transistor $Q_3$ will be held on for the duration of a peak pulse signal should the next recognizable $I_s$ peak occur before the end of the 11 m.s. timing period. Any recognized $I_s$ pulse peak occurring prior to the expiration of the 11 m.s. turning period will toggle inverter $L_7$ causing transistor $Q_3$ to turn on. When this occurs, bilateral switch $TG_2$ is closed allowing capacitor $C_5$ to discharge and thereby resetting the peak holding and peak pulse circuit 40. Turning on transistor $Q_3$ also discharges capacitor $C_6$ by bringing point 86 close to ground.

The $f_2$ timing circuit 50 operates in a similar manner. The peak pulse signal is introduced across the base-emitter junction of the normally non-conducting transistor $Q_1$. When applied, the peak pulse signal turns on transistor $Q_1$, charging capacitor $C_2$ to the voltage level of the plus bus. Capacitor $C_2$ remains charged for 33 m.s., the RC time constant of resistor $R_2$ and capacitor $C_2$. If a second recognizable $I_s$ peak is not encountered within 33 m.s., then the RC timing voltage across capacitor $C_2$ will fall below the reference voltage level at the plus input to amplifier $A_{20}$. This will cause the output of amplifier $A_{20}$ to be set high. This action turns on transistor $Q_4$, which is normally on but was turned off when capacitor $C_2$ was charged, causing the input to inverter $L_4$ to be set to a logical LO. This, as noted above, causes the bilateral switch $TG_2$ to be reset, discharging capacitor $C_5$. The 33 m.s. timing span is the half-cycle time of 15 hertz which corresponds to the high end of the SSC frequency range of interest. As in the operation of the $f_1$ timing circuit 48, the $f_2$ timing circuit will not cause a reset of the peak holding and peak status circuit 40, if the next recognizable $I_s$ peak occurs within the timing period.

The $I_s$ start threshold circuit 42 includes comparator $A_{18}$ and a voltage reference source 88. The input to the positive terminal of comparator $A_{18}$ is held at the value of the sensed peak voltage, the voltage at point 84. The reference voltage source 88 is set to a minimum level for which SSC evaluation at the starting point is deemed to be worthwhile. If the value of the peak voltage exceeds the reference voltage, the output of comparator $A_{18}$ is set to a logical HI. This output is fed to NAND gate $L_2$ where it serves to set a starting point for SSC evaluation. For SSC signals below the $I_s$ start threshold, the comparator $A_{18}$ output inhibits switching of NAND gate $L_2$, thereby preventing initiation of the $f_1$ and $f_2$ timing circuits and the $\Delta T$ interval timing circuit 52 as well. It will also inhibit switching of the bilateral switch $TG_1$.

The $I_s$ finish threshold circuit 44 includes comparator $A_{17}$ and a voltage reference source 90. It causes a comparison of the peak voltage at point 84 with a reference voltage threshold signal representing the level that must be reached by the $I_2$ voltage signal at the end of the $\Delta T$ interval in order to warrant a rate of rise trip. If the voltage at point 84 exceeds this predetermined level at any time, the output of comparator $A_{17}$, which is normally low, is set high. The output of comparator $A_{17}$ serves as an input to NAND gate $L_{11}$, part of the rate of rise trip decision circuit 56.

The instantaneous $I_s$ threshold circuit 46 includes comparator $A_{19}$ and a voltage reference source 92. The peak voltage at point 84 is compared to a voltage level which is felt would warrant shortening the $\Delta T$ interval of timing circuit 52 from $T_1$ to $T_2$ milliseconds. The output of comparator $A_{19}$ is switched high whenever the instantaneous value of the voltage at point 84 exceeds the instantaneous threshold value. When this happens, one input to NAND gate $L_9$ is set to a logical HI. In addition, bilateral switch $TG_3$ is turned on shortening the time constant of the $\Delta T$ interval timing circuit. Inverter $L_3$ inverts the output of comparator $A_{19}$ and sets one input of each of the NAND gates $L_{11}$ and $L_{12}$ to a logical LO. This inhibits actuation of these gates and thereby overrides a rate of rise trip.

The $\Delta T$ interval timing circuit 52 includes a comparator $A_{22}$. The negative input terminal of this comparator is connected to a voltage reference set by resistors $R_9$, $R_{12}$ and $R_{13}$. The output of comparator $A_{22}$ is normally low. Whenever the $f_1$ or $f_2$ timing circuits 48 or 50 being to time out, point 86 is pulled up from ground potential allowing capacitor $C_6$ to begin charging. When the voltage across capacitor $C_6$ reaches the voltage reference level on the negative input terminal of comparator $A_{22}$, it will switch and output a high level signal indicating expiration of the $\Delta T$ time period. If the instantaneous $I_s$ level has not been exceeded, $TG_3$ is still off and the rate of charge of capacitor $C_6$ is a function of the RC time constant determined by the values of capacitor $C_6$ and resistor $R_7$. However, when the SSC signal exceeds the instantaneous threshold level set by reference source 92, $TG_3$ is switched on, placing resistors $R_7$ and $R_8$ in parallel thereby causing capacitor $C_6$ to be charged at a faster rate. Thus, with $TG_3$ open the RC time constant is set to the $T_1$ or 150 m.s. time span and with $TG_3$ closed or on, the RC time constant is shortened to the $T_2$ or 50 m.s. time interval. In either case, the output of comparator $A_{22}$ is switched high at the end of the $\Delta T$ timing period. When this occurs, NAND gate $L_{12}$ is switched, if the negated instantaneous $I_s$ threshold signal is not already present on its other input, causing transistor $Q_5$ to be turned off. Capacitor $C_7$ and resistor $R_{11}$ form an RC network which delays receipt of the comparator $A_{22}$ by NAND gate $L_{11}$ so that if a recognizable $I_s$ peak occurs at the end of the $\Delta T$ timing period, it will not be ignored. With switch $SW_1$ closed, bilateral switch $TG_4$ is opened allowing capacitor $C_6$ to discharge via resistor $R_{10}$ thereby automatically resetting the $\Delta T$ interval timing circuit. If switch $SW_1$ is not closed or the automatic reset feature is not employed, and the $\Delta T$ timing period expires without the issuance of a trip signal, the apparatus 36 will continue to monitor the SSC levels without re-running the $\Delta T$ interval timing circuit 52. In such an instance, a trip signal will be generated whenever a recognizable SSC peak exceeding the $I_s$ finish threshold level is encountered.

The rate of rise decision circuit 56 includes NAND gates $L_{11}$ and $L_{12}$, flip-flop $L_8$ and transistor $Q_6$. In order for NAND gate $L_{11}$ to issue a rate of rise trip signal, the output of comparator $A_{22}$ must be high ($\Delta T$ has expired), the $I_s$ finish threshold level must be exceeded and the instantaneous $I_s$ threshold level must not have been reached. If all three constraints are met, the rate of rise trip signal is issued and turns on transistor $Q_7$ in the rate of rise indicator circuit 64. This, in turn, gates on the rate of rise $SCR_1$ causing it to conduct current through the rate of rise trip indicator 64 and to forward a trip signal to the trip circuit 62.

NAND gate $L_{12}$ is switched after the output of comparator $A_{22}$ goes high with the instantaneous $I_s$ threshold level not being reached. This causes flip-flop $L_8$ to be set turning on transistor $Q_6$. When transistor $Q_6$ is turned on, it causes a rate of rise count signal to be forwarded to totalizer 63 via line 57.

The instantaneous trip decision circuit 54 includes NAND gate $L_9$ and inverter $L_{10}$. After the output of comparator $A_{22}$ goes high and assuming that the instantaneous $I_s$ threshold level has been violated, NAND gate $L_9$ will be switched. This sets the inverter $L_{10}$ causing its output to be set to a logical HI. In turn, this sets one input of NAND gate $L_{13}$ to a logical HI, thereby arming NAND gate $L_{13}$. When the next recognizable $I_s$ peak occurs, inverter $L_7$ sets the other input of NAND gate $L_{13}$ to a logical HI causing its output to go to a logical LO. This results in transistor $Q_8$ being turned on, firing $SCR_2$ causing it to conduct current through the instantaneous trip indicator 68. Gating SCR$_2$ on will also cause it to forward a trip signal to the trip circuit 62.

When NAND gate L$_9$ switches inverter L$_{10}$, it also turns on transistor Q$_9$, permitting an instantaneous count signal to be forwarded to the instantaneous event totalizer 66. It should be noted that the instantaneous event can be recorded or counted without waiting for the next recognizable I$_s$ peak to occur. This is permitted since a user will want to know that a set of conditions has taken place which would otherwise have caused a trip, except that a succeeding recognizable I$_s$ peak may not have occurred. However, for the sake of the integrity of the monitored power system or avoidance of unnecessary trips, the instantaneous trip signal is permitted only when that danger point is recognized and is also verified as to interval of occurrence by the arrival of the next recognizable I$_s$ peak. Thus, a minimum of 50 m.s. ΔT plus one additional recognizable I$_s$ peak is required to trip which means that at least one full SSC cycle is evaluated.

While the invention has been described and shown herein in considerable detail, each disclosure is to be considered as only illustrative or exemplary in character and not restrictive, as within the broad scope of the invention modifications or alternatives may readily suggest themselves to persons skilled in this art.

What is claimed and is desired to be secured by United States Letters Patent is as follows:

1. Apparatus for monitoring a power system for subsynchronous current oscillations having a predetermined frequency range of interest over a predetermined period of evaluation, said apparatus comprising:

first circuit means operably coupled to the power system for developing a signal representative of the subsynchronous current therein;

second circuit means operably coupled to said first circuit means for performing a full wave rectification of the subsynchronous current signal;

third circuit means operably coupled to said second circuit means for receiving said rectified signal and for detecting each pulse therein, said third circuit means being adapted to hold a predetermined pulse and to recognize and hold only those subsequent pulses which are greater in value than the held pulse by at least a predetermined magnitude, and for holding the value of each such recognized pulse at its output, said third circuit means being further adapted to be reset upon receipt of an appropriate resetting signal to discharge said held pulse and begin the detection of new pulses;

first comparator circuit means operably coupled to said third circuit means, including a first voltage reference threshold, for generating a first output signal whenever the value of said held pulse at the start of the period of evaluation reaches a predetermined level with respect to said first threshold;

fourth circuit means operably coupled to said third circuit means and said first comparator circuit means for comparing the value of said held pulse with a subsequent pulse, and for generating a pulse recognition signal whenever the magnitude of the subsequent pulse reaches a predetermined level with respect to the held pulse and a first signal is received from said first comparator circuit means;

second comparator circuit means operably coupled to said third circuit means, including a second voltage reference threshold, for generating a second output signal whenever the instantaneous value of said held pulse reaches a predetermined level with respect to said second threshold;

third comparator circuit means operably coupled to said third circuit means, including a third voltage reference threshold, for generating a third output signal whenever the value of said held pulse at the finish of the period of evaluation reaches a predetermined level with respect to said third threshold;

first timing circuit means operably coupled to said third and fourth circuit means to receive said pulse recognition signal and having a first timing period corresponding to the frequency at the low end of the subsynchronous frequency range of interest for generating a first resetting signal for said third circuit means whenever two successive recognizable pulses are separated in time of occurrence by a period less than said first timing period and for inhibiting generation of said first resetting signal whenever two successive recognizable pulses are separated in time of occurrence by a period greater than said first timing period;

second timing circuit means operably coupled to said third and fourth circuit means to receive said pulse recognition signal and having a second timing period corresponding to the frequency at the high end of the subsynchronous frequency range of interest for generating a second resetting signal for said third circuit means whenever two successive recognizable pulses are separated in time of occurrence by a period greater than said second timing period and for inhibiting generation of said second resetting signal whenever two successive recognizable pulses are separated in time of ocurrence by a period less than said second timing period;

third timing circuit means operably coupled to said first and second timing circuit means and having a third timing period equal to the predetermined period of evaluation for generating a fourth output signal whenever two successive recognizable pulses are separated in time of occurrence by a period greater than said first timing period and less than said second timing period at the conclusion of said third timing period; and logic circuit means operably coupled to said first, second, and third comparator circuit mear and said third timing circuit means for generating an output signal whenever said first, second, third and fourth output signals reach a predetermined logical relationship.

2. The apparatus according to claim 1, wherein said second comparator means is also operably coupled to said third timing circuit means to receive said second output signal and said third timing circuit means additionally includes variable timing period circuit means for establishing said third timing period in the absence of said second output signal and for shortening said third timing period in response to receipt of said second output signal.

3. The apparatus according to claim 2 wherein the logic circuit means includes means for delaying the issuance of its output signal when the third timing period has been shortened, until the fourth circuit means issues one more pulse recognition signal.

4. Apparatus for monitoring an electrical power system for a subsynchronous current oscillation, comprising:

first means providing a first signal responsive to a subsynchronous current oscillation in the electrical power system, second means providing a second signal responsive to a predetermined amplitude of the pulses of the first signal, third means providing a third signal responsive to the frequency of the first signal, fourth means providing a fourth signal responsive to the rate of rise of the first signal, and fifth means responsive to the second, third and fourth means for providing a fifth signal only when the second signal indicates the predetermined amplitude of the pulses of the first signal exceeds a predetermined minimum magnitude, the third signal indicates the frequency of the first signal is within a predetermined range, and the fourth signal indicates the rate of rise of the first signal over a first predetermined period of time has exceeded a predetermined magnitude.

5. The apparatus of claim 4 including rectifier means for rectifying the first signal to provide successive unidirectional pulses responsive to both polarities of the first signal, with the second, third and fourth means being responsive to the successive unidirectional pulses of the rectified first signal.

6. The apparatus of claim 4 including sixth means providing a sixth signal responsive to the instantaneous magnitude of the first signal, and wherein the fourth means is additionaly responsive to the sixth signal, evaluating the rate of rise of the first signal over the first predetermined period of time when the sixth signal is below a predetermined magnitude, and providing an override signal prior to the expiration of the first predetermined period of time when the sixth signal reaches the predetermined magnitude within the first predetermined period of time, with said override signal, when generated, preventing the fifth means from providing the fifth signal.

7. The apparatus of claim 4 including sixth means providing a sixth signal responsive to the instantaneous magnitude of the first signal, and seventh means responsive to the first and second signals for providing a seventh signal each time the predetermined amplitude of a pulse of the first signal exceeds the predetermined amplitude of a preceding pulse, and the predetermined amplitude of the pulses exceeds a predetermined minimum magnitude, and wherein the fourth means includes timer means set to time out at the end of the first predetermined period of time, and settable to time out after a second predetermined period of time which is shorter than the first predetermined period of time, with said timer means starting the timing of the first predetermined period of time in response to said seventh signal, and wherein the timer means is set to time out at the end of the second predetermined period of time in the event the sixth signal exceeds a predetermined magnitude, with the fourth means providing an override signal at the end of the second predetermined period of time when the sixth signal exceeds the predetermined magnitude within the second predetermined period of time, and providing the override signal immediately when the sixth signal exceeds the predetermined magnitude after the expiration of the second predetermined period of time but before the expiration of the first predetermined period of time, with said override signal, when generated, preventing the fifth means from providing the fifth signal.

8. The apparatus of claim 6 including seventh means responsive to the first signal for providing a seventh signal each time the predetermined amplitude of a pulse of the first signal exceeds the predetermined amplitude of a previous pulse by a predetermined magnitude, and eighth means responsive to the fourth means, the sixth means and the seventh means, providing an eighth signal when the sixth signal has reached its predetermined magnitude, the fourth means has provided the override signal, and the seventh means has provided a seventh signal indicating the predetermined amplitude of the next pulse of the first signal has exceeded the predetermined amplitude of the previous pulse.

9. The apparatus of claim 6 including rate of rise event means responsive to the second, third and fourth means for providing a rate of rise event signal at the end of the first timing period in the absence of the override signal when the second signal indicates the predetermined amplitude of the pulses of the first signal exceed a predetermined minimum magnitude and the third signal indicates the frequency of the first signal is within the predetermined range.

10. The apparatus of claim 8 including instantaneous event means responsive to the fourth means and to the sixth means, for providing an instantaneous event signal when the sixth signal has reached its predetermined magnitude and the fourth means has provided the override signal.

11. Apparatus for monitoring an electrical power system for subsynchronous current oscillations having a predetermined frequency range of interest over a predetermined period of evaluation, comprising:

first circuit means operably coupled to the power system for developing a first signal having pulses representative of the subsynchronous current therein;

second circuit means operably coupled to said first circuit means for receiving said first signal and for detecting each pulse therein, said second circuit means being adapted to hold a predetermined pulse and to recognize and hold only those subsequent pulses which are greater in value than the held pulse, said second circuit means being further adapted to be reset upon receipt of an appropriate resetting signal to discharge said held pulse and begin the detection of new pulses;

first comparator circuit means operably coupled to said second circuit means, including a first reference, for generating a first output signal whenever the magnitude of the held pulse at the start of the period of evaluation reaches a predetermined level with respect to said first reference;

third circuit means operably coupled to said second circuit means and said first comparator circuit means for comparing the magnitude of the held pulse with the magnitude of a subsequent pulse each time a first signal is received from said first comparator circuit means, and for generating a pulse recognition signal each time the comparison results in the held pulse being replaced by a subsequent pulse;

second comparator circuit means operably coupled to said second circuit means, including a second reference, for generating a second output signal whenever the instantaneous value of the held pulse reaches a predetermined level with respect to said first reference;

third comparator circuit means operably coupled to said second circuit means, including a third reference, for generating a third output signal whenever the magnitude of the held pulse at the finish of the period of evaluation reaches a predetermined level with respect to said third reference;

fourth circuit means operably coupled to said second and third circuit means to receive said pulse recognition signal and for generating a reset signal for said second circuit means whenever two successive pulse recognition signals are outside the frequency range of interest, and for providing a fourth output signal whenever two successive pulse recognition signals are within the frequency range of interest;

and logic circuit means operably coupled to said first, second, and third comparator circuit means and said fourth circuit means for generating an output signal whenever said first, second, third and fourth output signals reach a predetermined logical relationship.

12. The apparatus of claim 11 including rectifier means for rectifying the first signal, with the second circuit means being responsive to the pulses of the rectified first signal.

* * * * *